United States Patent Office 3,494,919
Patented Feb. 10, 1970

3,494,919
PREPARATION OF STYRYLOXAZOLE
COMPOUNDS
Kenneth Henry Collins, North Plainfield, and John Edson
Gordon, Bridgewater Township, N.J., assignors to
American Cyanamid Company, Stamford, Conn., a corporation of Maine
No Drawing. Filed Aug. 2, 1966, Ser. No. 569,588
Int. Cl. C07d 85/44; C09k 1/02
U.S. Cl. 260—240                    10 Claims

ABSTRACT OF THE DISCLOSURE

The invention relates to an improved method for preparation of styryloxazole derivatives by the condensation of an aryl aldehyde with a 2-methyloxazole derivative in the presence of an inert solvent and an ammonium or amine salt of an arylsulfonic acid. The thus produced styryloxazoles have utility as optical brightening agents for textile materials and synthetic plastic materials.

---

The condensation reaction of aldehydes with compounds containing active methylene groups is well known. Formation of styryl derivatives by reaction of aryl aldehydes with methyl azole derivatives has been disclosed in the literature as having been accomplished in acidic or basic medium. The reaction may be represented as follows:

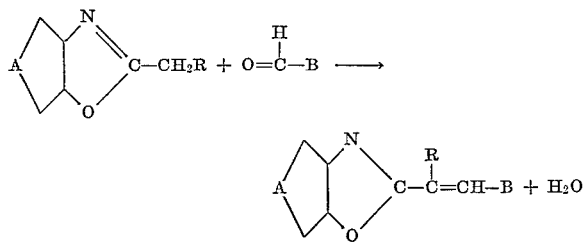

where A completes a benzo or naphtho residue; R is H or a lower alkyl; and B is an aryl radical. Both A and B may carry one or more simple substituents, such as lower alkyl, lower alkoxy, hydroxy, halo, cyano, nitro, etc.

Although the reaction is well known and many examples may be found in the literature, it is far from satisfactory for one or more of the following reasons; unduly long reaction time, low product yield, poor product purity and difficult product isolation. There exists, therefore, the need for an improved process for the production of styryloxazole derivatives whereby the objectionable features of the known process are overcome.

In accordance with the present invention, it has now been found that styryloxazole derivatives are obtained in high yield and purity and in substantially reduced reaction time when carried out in an inert solvent in the presence of an ammonium or amine salt of an aryl sulfonic acid. A special feature of the invention is that the styryloxazole derivative product is precipitated in filterable form by drowning the reaction mixture with water. These results are surprising in that the salts employed to promote the reaction are normally not considered as effective catalysts in this type of reaction. It is also surprising that the salts should be more effective in the reaction than the free aryl sulfonic acids from which they are derived, since the latter are sometimes effective dehydrating agents for condensation reactions. It is surprising, in addition, that similar salts of other acids or other salts of the same acid type are not as effective in the reaction as are those of the present invention.

In the process of the present invention one mole proportion of the methyloxazole is reacted with at least one mole proportion of the aldehyde in an inert solvent in the presence of from about 10 to about 15%, based on the weight of the reactants, of an ammonium or amine salt of an aryl sulfonic acid for a suitable time period; the reaction mixture is then drowned with water to precipitate the product. In a preferred procedure, the hydroxyacetamido precursor of the oxazole reactant is used as starting material, the oxazole being formed therefrom by ring closure thereof in the solvent in the presence of the aryl sulfonic acid. Since the ring closure reaction occurs at a lower temperature than the condensation reaction, it is most conveniently accomplished in the reaction mixture containing the requisite amounts of the sulfonic acid, ammonia or amine and aldehyde for the condensation reaction which is then effected without isolating the oxazole, the ammonium or amine salt catalyst also being formed in situ.

While a minimum of one mole of aldehyde per mole of oxazole is required for the reaction, it is preferable to use an excess, i.e., from about 10–50%, preferably about 10–20%, above the stoichiometric requirements. Further excesses provide no further improvement in the process and prove to be uneconomical.

Examples of aromatic aldehydes which may be used in the reaction include: benzaldehyde, anisaldehyde, phthalaldehyde, isophthalaldehyde, terephthalaldehyde, naphthaldehyde, 2-hydroxybenzaldehyde, p-nitrobenzaldehyde, 2-chlorobenzaldehyde, 3-chlorobenzaldehyde, 4-chlorobenzaldehyde, p-acetamidobenzaldehyde, and p-cyanobenzaldehyde.

As above-indicated, the process of the invention is applicable to oxazole derivatives of the benzo and naphtho classes. As starting materials, the 2-methyl derivatives may be used or a reaction mixture containing them obtained by ring closing the N-acetyl derivatives of an aminophenol or aminonaphthol may be employed without isolation of the oxazole. Suitable oxazoles are exemplified by 2-methylbenzoxazole, 2,5,6-trimethylbenzoxazole, 2-methyl - 5 - methoxybenzoxazole, 2-methyl-4-hydroxybenzoxazole, 2-methyl-4-cyanobenzoxazole, 2-methyl-4-chlorobenzoxazole, 2-methyl-5-nitrobenzoxazole, 2-methylnaphth[1,2-d]oxazole, 2,9 - dimethylnaphth[1,2-d]oxazole, 2-methyl - 8 - methoxynaphth[1,2-d]oxazole, 2-methyl-8-hydroxynaphth[1,2-d]oxazole, 2-methyl-5-chloronaphth[1,2 - d]oxazole, 2-methyl-8-cyanonaphth[1,2-d]oxazole and 2-methyl-8-nitronaphth[1,2-d]oxazole.

As to the inert solvents used in the process, it is desirable that they should form an azeotrope with water, since this affords a convenient means for removing water from the reaction mixture as it is formed. Among the inert organic solvents that may be employed are benzene, chlorobenzenes such as o-dichlorobenzene, toluene, xylene, etc., with xylene being preferred. The amount of solvent employed may vary from about 25 to about 100%, preferably from about 35 to about 60%, based on the weight of the reactants. However, the amount is not critical, except that it should be sufficient to permit easy stirring of the reaction mixture.

The reaction is run at reflux temperature, i.e., the boiling point of the solvent or the water-solvent azeotrope formed early in the process. During reflux the water formed in the reaction and present in the reflux vapor is collected in a suitable trap. Formation of water is an indication that the reaction is proceeding and termination of such formation indicates that the reaction is complete. For satisfactory results, it is necessary to remove water from the reaction mixture as it is formed. The time required for the completion of the reaction will vary to some extent depending upon the particular reactants, the solvent employed, the reflux temperature, the batch size, etc. Thus, the time may vary from about 18 to about 30 hours when the reaction is run on a commercial scale and from about 5 to 8 hours when run on a laboratory scale. For example, when about 3000 grams of reactants are employed with xylene as solvent and the reflux temperature reaches 163° C. during the final stages, the reaction time is about 5.5 hours.

The aryl sulfonic acids which may be used in preparing the ammonium or amine salts of the present invention include unsubstituted and $C_1$–$C_{18}$ alkyl-substituted benzene and naphthalene sulfonic acids. Specific examples of such acids are benzene sulfonic acid, p-toluene sulfonic acid, xylene sulfonic acid, dodecylbenzene sulfonic acid, octadecylbenzene sulfonic acid, naphthalene sulfonic acid and methyl-, octyl-, dodecyl- and hexadecyl-substituted naphthalene sulfonic acids. It is preferred however, to use an aryl sulfonic acid having an alkyl substituent of a size sufficient to impart surfactant properties thereto, since this further improves the overall process, especially with respect to isolation of the product in a high quality condition. However, the particular type of aryl sulfonic acid is not critical when considering only the beneficial action as a catalyst for the reaction. Benzene and naphthalene sulfonic acids without alkyl substituents show little if any surfactant effects as salts. Surfactant effects of significance begin when an alkyl substituent of three to eighteen or more carbon atoms are introduced on the ring. Particularly good properties are shown when the alkyl substituent has from about 8 to about 16 carbon atoms. In the present invention, dodecylbenzene-sulfonic acid is the preferred alkylaryl sulfonic acid because of the surfactant effects of the catalytic salt.

The salts of the aryl sulfonic acids are prepared by interaction therewith of a stoichiometric quantity of ammonia, a lower alkyl ($C_1$–$C_6$) primary amine, such as ethyl amine, or a lower alkyl ($C_1$–$C_6$) secondary amine, such as diethyl amine. An excess of the amine or ammonia is not necessary but may be employed, especially where the condensation reaction and/or separation of the oxazole product is to be effected under alkaline conditions. On the other hand, an excess of sulfonic acid is employed if the condensation and ring closure are performed with a single reaction mixture. Mixtures of the sulfonic acids may be employed in preparing the salts, and the salts may be either added directly to the reaction mixture or formed in situ. The amount of the ammonium or amine salt employed in the process may vary from about 10 to about 50%, preferably from about 15 to about 30%, based on the weight of the reactants.

Following completion of the reaction, as described above, the product is conveniently isolated from the reaction mixture by drowning in water according to usual practices, followed by filtering and drying, with intermediate washing as desired. It is a particular advantage of the present process that the crystalline product obtained in the drowning step is readily filtered and product purity is so high as to obviate recrystallizations.

The superiority of the present process is illustrated by the reaction of benzaldehyde with 2-methylnaphthoxazole, without, however, limiting the scope of the present invention to this particular reaction. Thus, following known procedures and carrying out the reaction in xylene in the presence of zinc chloride, only a 10% yield of product is obtained even on heating over a 40-hour period. Similarly, in toluene with iodine as catalyst, less than a 10% yield is obtained after 24 hours of heating. In xylene with dimethyl formamide as catalyst, no product is obtained even after heating for 49 hours. In xylene with p-toluene sulfonic acid as catalyst, a yield of only 22% is obtained after 49 hours. In xylene with a combination of dimethyl formamide and p-toluene sulfonic acid as catalyst, a yield of 90% or more may be obtained, but time requirements for such yields approach 40 hours. Also, the product is contaminated with impurities which are not removable by water washing. Therefore, in order to attain the high level of purity desired for the principal use of the product, i.e., as an optical brightening agent, more tedious and/or expensive means of purification must be employed.

The process of the present invention, however, results in yields of 90% or more in times as little as 5 to 6 hours. Also, by the present process products are attainable (using a detergent-type sulfonic acid to prepare the catalyst salt) in which the impurities present are of such a nature that they are readily removable by water-washing to provide the desired level of purity for use of the products as optical brightening agents.

Additionally, in the prior methods, when the product is separated by the drowning procedure, as much as 72 hours were required before the product separated from the drowning mixture in a filterable form, whereas in the present process this separation is obtained in as little as nine hours.

The superior features of the present invention, therefore, include high yields, increased product purity, shorter reaction times and a greatly reduced time of product recovery from the drowning mixture.

As already mentioned, the 2-styryloxazole compounds provided by the process of the invention find important use as optical brighteners for a variety of textile materials, both natural and synthetic, such as cotton, wool, silk, nylon, polyesters, etc. They also effectively brighten a variety of synthetic plastic materials whether woven or solid such as polyacrylates, polyvinyl halides, and the like. As is well known, brightening agents to be fully effective, must be of high purity. A particular advantage of the process of the invention is that it provides products of suitable purity for such use without application of tedious and/or expensive purification techniques.

The invention is further illustrated by the following examples in which all parts are by weight.

EXAMPLE 1

Preparation of 2-styrylnaphth[1, 2-d]oxazole (commercial scale)

407 parts of 22% ammonia (5.26 moles) were added to a mixture of 1450 parts of xylene and 1268 parts of dodecylbenzenesulfonic acid (3.89 moles) holding the temperature below 40° C. 1354 parts benzaldehyde (12.8 moles) and 1736 parts 1-acetamido-2-naphthol (8.65 moles) were then added and the whole heated to reflux, water being removed azeotropically. Reflux began at about 90° C. and the temperature gradually rose to a constant boiling mix of 160–163° C. Reflux is continued for 28 hours to complete the reaction. The reaction mixture was cooled to 90–95° C. and drowned into 24,250 parts water. The drowning mixture was then stirred for 9 hours after which the product was isolated by filtration and washed with water. Upon drying at 80° C., 2094 parts (89.6% yield) of light yellow crystals of 99.0% purity (M.P., 127–128° C.) were obtained.

EXAMPLE 2

Preparation of 2-styrylnaphth[1, 2-d]oxazole

To a mixture of 134 parts of xylene, 12.6 parts of dodecylbenzenesulfonic acid (0.04 mole) and 127.2 parts of benzaldehyde (1.2 moles) there was added 234 parts of a solution containing 110 parts of ammonium dodecylbenzenesulfonate (0.32 mole). 30.7 parts of ammonium xylenesulfonate (0.15 mole), 17.4 parts of ammonium sulfate, and 75.9 parts of water. 160.8 parts of 1-acetamido-2-naphthol (0.8 mole) were then added and the whole heated to reflux. Reflux began at 98° C., and the temperature gradually rose to a constant boiling mix at 163° C. The reflux was continued with removal of water azeotropically for 5.5 hours. The reaction mixture was then cooled to 90–95° C. and drowned into 2400 parts water. The drowning mixture was stirred for 9 hours and the product isolated by filtration, after which it was washed with water and dried at 80° C. The product (93.4% yield) was the same as in Example 1.

EXAMPLE 3

Preparation of 2-styrylnaphth[1,2-d]oxazole

To a solution of 33.5 parts of xylene and 26.2 parts of dodecylbenzenesulfonic acid (0.08 mole) there was cautiously added 5.85 parts of diethylamine (0.08 mole). External cooling was required to maintain the exothermic reaction at 45–50° C. To this solution was added 3.0 parts of dodecylbenzenesulfonic acid (0.009 mole), 40.2 parts of 1-acetamido-2-naphthol (0.2 mole) and 31.8 parts of benzaldehyde (0.3 mole). The mixture was heated at reflux for 8.5 hours, removing water azeotropically. Reflux started at 122° C., and rose gradually to a constant boiling mixture at 166° C. The mixture was cooled to 90–95° C. and drowned in 600 parts of water. The drowning medium was adjusted to pH 9.0–9.5 with aqueous sodium hydroxide and stirred for 16 hours. The product was then isolated by filtration, washed with water and dried. (Yield=82.4%.)

EXAMPLE 4

Preparation of 2-(p-chlorostyryl)naphth[2,1-d]oxazole

Following the procedure of Example 1, 155 parts (1.1 moles) of p-chlorobenzaldehyde is reacted with 183 parts (1.0 mole) of 2-methylnaphth[2,1-d]oxazole. The product, 2-(p-chlorostyryl)naphth[2,1-d]oxazole was obtained in 85% yield as a brilliant greenish yellow crystalline solid. (M.P.=181–182.5° C.)

EXAMPLES 5–9

Following the procedure of Example 1, a number of other preparations were conducted. The starting materials and products are listed in Table I.

We claim:
1. A process for preparing a 2-styryloxazole compound which comprises the steps of:
(1) forming a reaction mixture consisting essentially of (a) a 2-methyloxazole compound selected from the group consisting of substituted and unsubstituted 2-methylbenzoxazoles, substituted and unsubstituted 2-methylnaphthoxazoles, the substituents of said substituted oxazoles being selected from the group consisting of lower alkyl, lower alkoxy, hydroxy, cyano, nitro and halogen radicals, (b) an aryl aldehyde selected from the group consisting of substituted and unsubstituted benzene aldehydes and substituted and unsubstituted naphthalene aldehydes, the substituents of said substituted aldehydes being selected from the group consisting of lower alkyl, lower alkoxy, hydroxy, cyano, nitro and halogen radicals, (c) a salt selected from the group consisting of an ammonium salt, a primary lower alkyl amine salt and a secondary lower alkyl amine salt of an aryl sulfonic acid selected from the group consisting of unsubstituted and $C_1$–$C_{18}$ alkyl-substituted benzene and naphthalene sulfonic acids, and (d) an inert solvent; the proportions of 2-methyloxazole and aryl aldehyde employed being from substantially stoichiometric proportions to about 50% excess aldehyde and the proportion of said salt being from about 10% to about 50%, based on the combined weight of the 2-methyloxazole and the aldehyde;
(2) heating the reaction mixture at reflux temperature to effect condensation of the 2-methyloxazole with the aryl aldehyde;
(3) removing water of condensation from the reaction mixture, and
(4) recovering the 2-styryloxazole product from the reaction mixture.
2. The process of claim 1 wherein said salt (c) is the ammonium salt of dodecylbenzene sulfonic acid, the inert solvent (d) is xylene, the proportion of said salt is from about 15% to about 30% and, the 2-styryloxazole product is recovered from the reaction mixture by drowning with water and filtering.
3. The process of claim 2 wherein the 2-methyloxazole is 2-methylnaphth[1,2-d]oxazole and the aldehyde is benzaldehyde.
4. The process of claim 2 wherein the 2-methyloxazole is 2,5,6-trimethylbenzoxazole and the aldehyde is p-cyanobenzaldehyde.
5. The process of claim 2 wherein the 2-methyloxazole is 2-methylnaphth[1,2-d]oxazole and the aldehyde is 3-chlorobenzaldehyde.
6. The process of claim 2 wherein the 2-methyloxazole is 2,5-methylbenzoxazole and the aldehyde is 3-chloro-4-cyanobenzaldehyde.
7. The process of claim 1 wherein the said salt (c) is the diethylamine salt of dodecylbenzene sulfonic acid, the inert solvent (d) is xylene, the proportion of said salt is from about 15% to about 30% and the 2-styryloxazole product is recovered from the reaction mixture by drowning with water and filtering.
8. The process of claim 7 wherein the 2-methyloxazole is 2-methylnaph[2,1-d]oxazole and the aldehyde is benzaldehyde.
9. The process of claim 1 wherein step 1 the 2-methyloxazole compound (a) is formed in the solvent (d) by ring closure of the hydroxyacetamido precursor thereof in the presence of an aryl sulfonic acid selected from the group consisting of unsubstituted and $C_1$–$C_{18}$ alkyl-substituted benzene and naphthalene sulfonic acids, and salt (c) is formed in said solvent from ammonia or a lower alkyl primary or secondary amine and the aryl sulfonic acid.
10. The process of claim 1 wherein in step 1 the 2-methyloxazole compound (a) is 2-methylnaphth[1,2-d]oxazole and is formed by ring closure of 1-acetamido-2-naphthol in xylene in the presence of dodecylbenzene sulfonic acid, salt (c) is the ammonium salt of dodecylben-

TABLE I

| Example No. | Aldehyde reactant | Oxazole reactant | Product | Product, M.P., ° C. |
|---|---|---|---|---|
| 5 | p-Acetamido-benzaldehyde | 2-methylnaphth-[2,1-d]oxazole | 2-(p-acetamidostyryl)-naphth[2,1-d]oxazole. | 240–242 |
| 6 | p-Cyanobenzaldehyde | 2,5,6-trimethylbenzoxazole | 2-(p-cyanostyryl)-5,6-dimethylbenzoxazole. | 207–208 |
| 7 | p-Anisaldehyde | do | 2(p-methoxystyryl)-5,6-dimethylbenzoxazole. | 159.5–160 |
| 8 | p-Nitrobenzaldehyde | 2-methylnaphth-[2,1-d]oxazole | 2-(p-nitrostyryl)naphth-[2,1-oxazole. | 241–241.5 |
| 9 | 1-naphthaldehyde | do | (2-(1-naphthyl)vinyl)-naphthoxazole. | 173–174 | zene sulfonic acid and is formed in said solvent (c) by reaction of ammonia with dodecylbenzene sulfonic acid and the aryl aldehyde (b) is benzaldehyde; and wherein in step 4, the 2-styryloxazole product is recovered from the reaction mixture by drowning with water and filtering.

References Cited

UNITED STATES PATENTS 3,274,184  9/1966  Thompson et al. ____ 260—240

FOREIGN PATENTS 239,148  6/1962  Australia.

JOHN D. RANDOLPH, Primary Examiner

U.S. Cl. X.R.

252—301.2; 260—89.5, 92.8, 240.9, 501.21